March 25, 1969  G. H. CARTER  3,434,260
TILED ROOFS

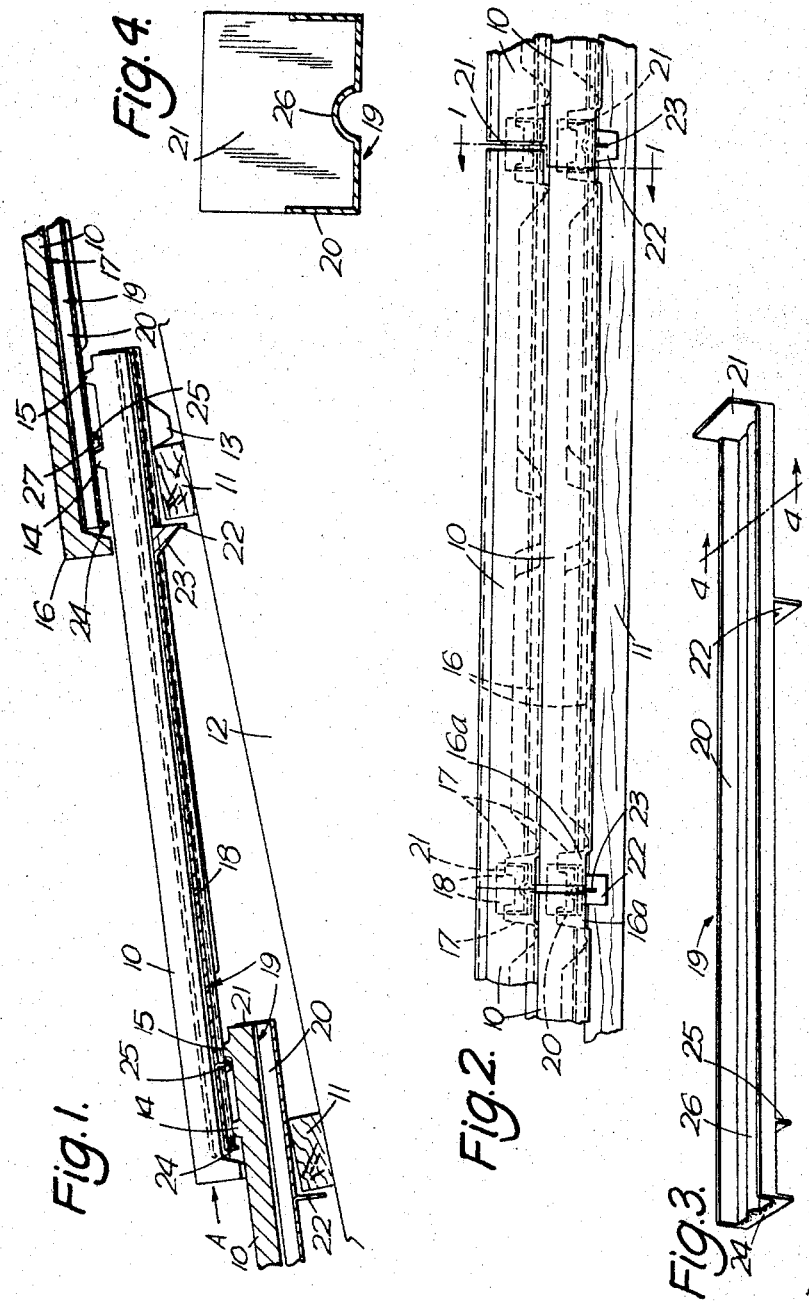

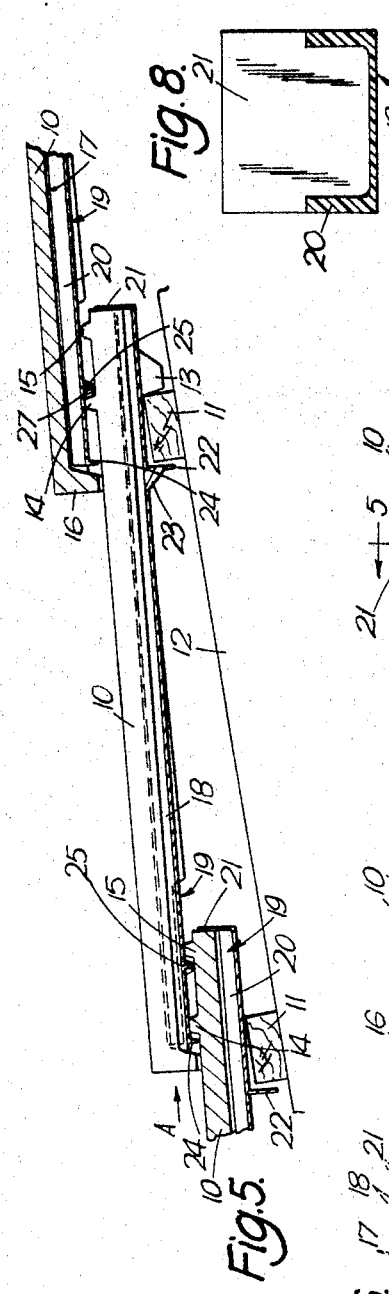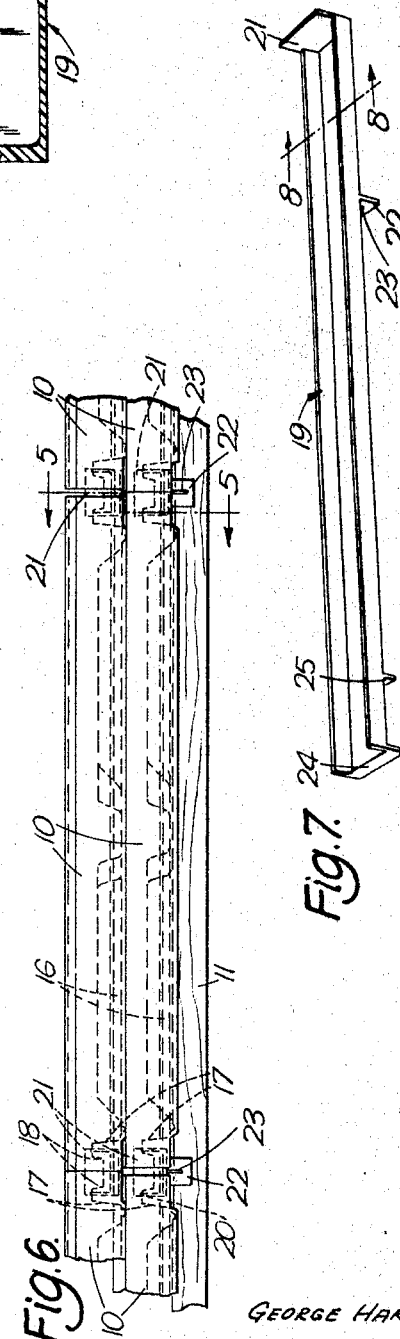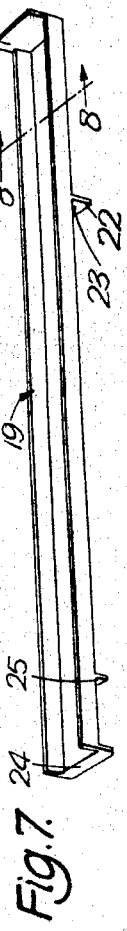

Filed Jan. 30, 1967  Sheet 3 of 5

INVENTOR
GEORGE HAROLD CARTER
BY Young & Thompson
ATTYS.

March 25, 1969    G. H. CARTER    3,434,260
TILED ROOFS
Filed Jan. 30, 1967    Sheet 4 of 5
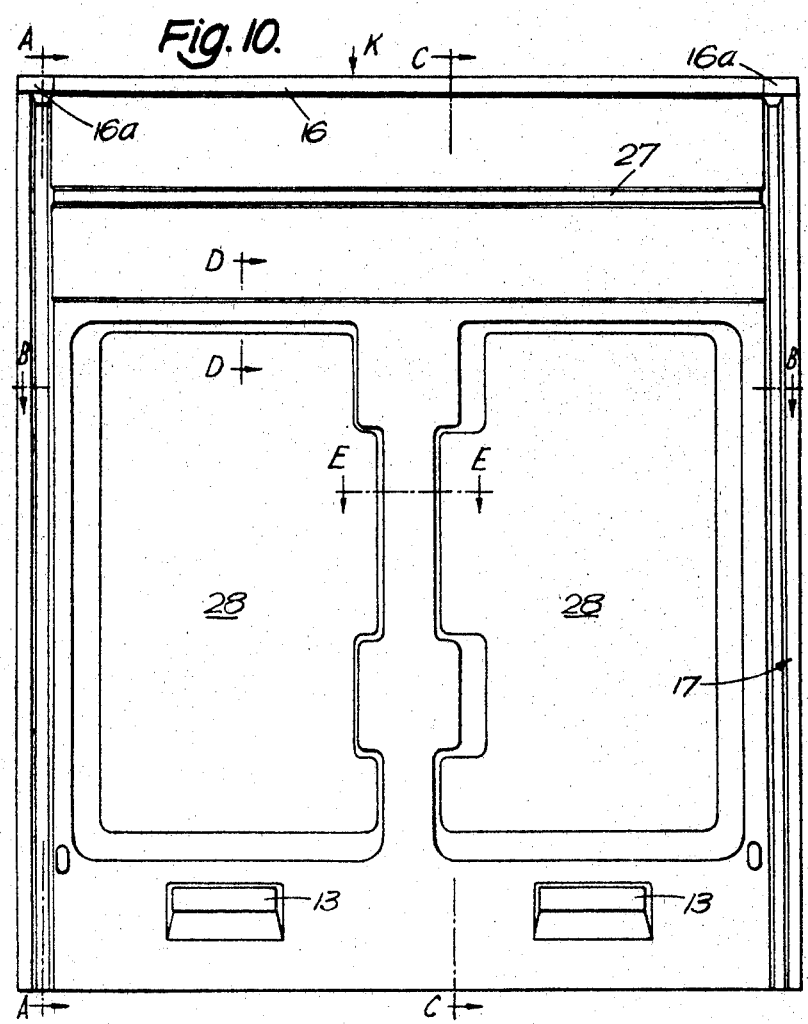
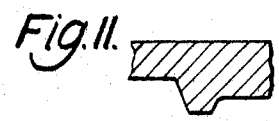
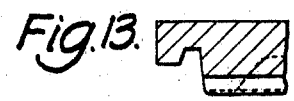
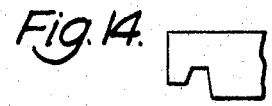
INVENTOR
GEORGE HAROLD CARTER
BY Young + Thompson
ATTYS.

March 25, 1969  G. H. CARTER  3,434,260
TILED ROOFS

Filed Jan. 30, 1967

INVENTOR
GEORGE HAROLD CARTER
BY Young + Thompson
ATTYS

United States Patent Office 3,434,260
Patented Mar. 25, 1969

3,434,260
TILED ROOFS
George Harold Carter, Reigate, Surrey, England, assignor to Redland Tiles Limited, Reigate, England, a British company
Filed Jan. 30, 1967, Ser. No. 612,509
Claims priority, application Great Britain, Feb. 1, 1966, 4,442/66; Mar. 23, 1966, 22,959/66
Int. Cl. E04c 1/34; E04b 7/02; E04d 13/04
U.S. Cl. 52—471                                              8 Claims

ABSTRACT OF THE DISCLOSURE

A series of separately formed gutters underlies the joins between adjacent tiles disposed side-by-side. Water penetrating the joins is drained by the underlying gutter on to the next lower tile or on to the aligned next lower channel. Each gutter has a plane bottom wall from which projects downwardly a locating flange perpendicular to the length of the gutter.

---

The invention relates to tiled roofs and to gutters for underlying the join between roofing tiles disposed side-by-side.

The invention provides a gutter for underlying the join between a pair of roofing tiles disposed side-by-side, which gutter comprises an elongated channel section portion having a substantially plane bottom wall and one or more flanges projecting from the underside of said bottom wall and extending at right angles to the lengthwise dimension of the gutter.

Preferably the gutter has a locating flange projecting downward beyond the bottom surface of the said portion.

Preferably the gutter is moulded from a synthetic plastics material.

The invention also provides a gutter as aforesaid in combination with a pair of roofing tiles disposed side-by-side, the gutter underlying the join between the tiles and being the same length or substantially the same length as the abutting edges of the tiles.

The invention also provides a gutter as aforesaid in combination with a pair of roofing tiles which are disposed side-by-side and each of which has extending along its edge abutting the other tile a rebate such that the two rebates together form a channel opening to the underside of the tiles, the gutter underlying the join between the tiles, and the channel having a height and width sufficient to enable the channel wholly to accommodate at least the channel section portion of the gutter.

Preferably the rebates and the gutter terminate short of the tail of the tile.

Preferably the gutter has at one end a member which projects beyond the channel section member and abuts the head end of at least one of the two tiles.

The invention includes a tiled roof comprising laterally-extending rows of tiles, the tails of the tiles in each row overlapping the heads of the tiles in the next lower row, and each tile being disposed in abutting relationship with the two flanking tiles in the same row, and there being disposed under each join between each pair of neighbouring tiles in each row a gutter as aforesaid.

Preferably the upper face of each tile has at its head end two or more transverse upstanding ribs extending across the upper face of the tile, each gutter overlaps said ribs on the tile in the next lower row and the overlapping portion of the gutter has on its bottom surface at least one flange projecting towards but stopping short of the upper face of that tile, said flange or flanges being staggered relative to the upstanding ribs.

Preferably the bottom surface of the or each gutter is spaced above at least one of said ribs.

Figure 9:
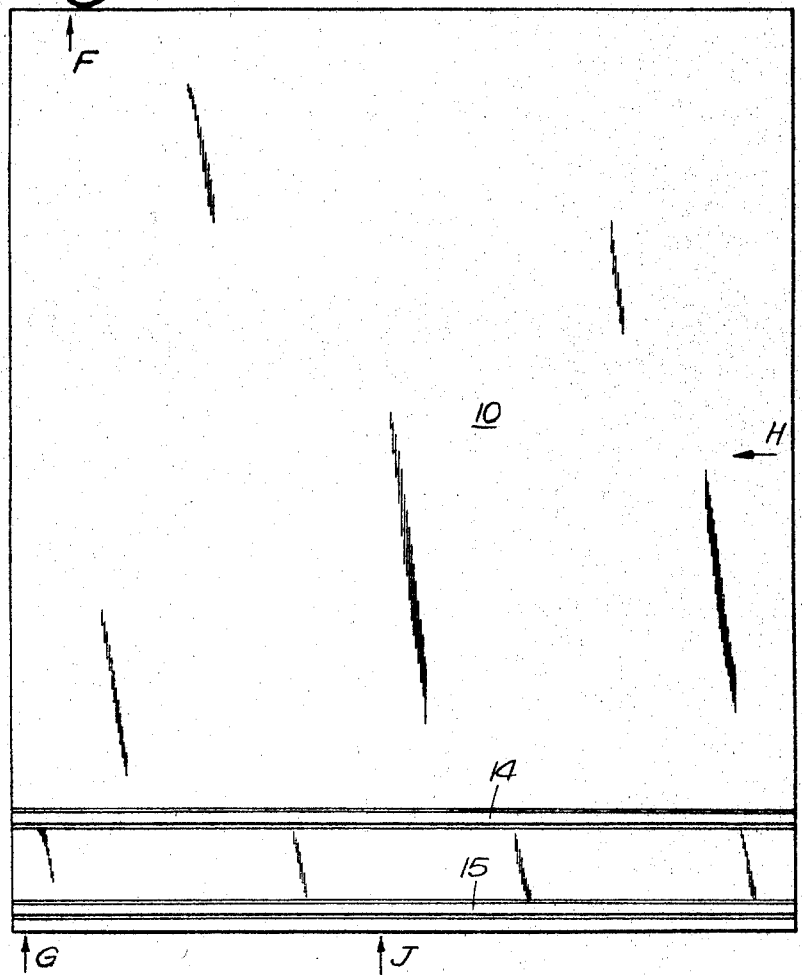
Figure 20:
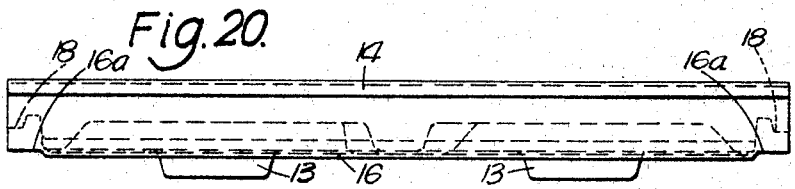
Figure 21:
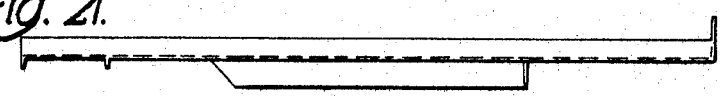
Figure 15:
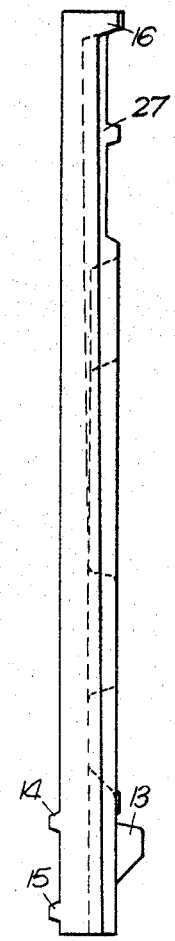
Figure 17:
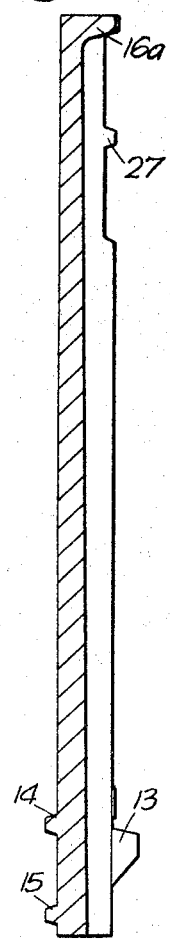
Figure 18:
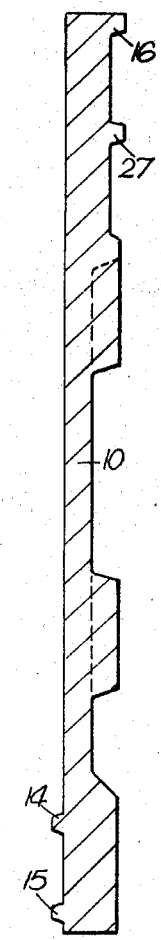
Figure 16:
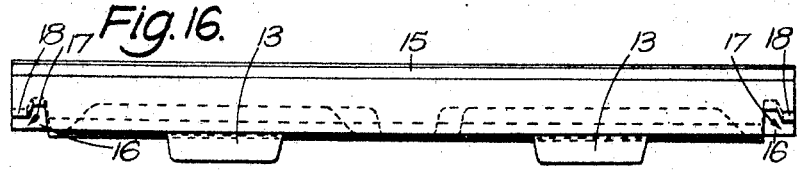
Figure 19:
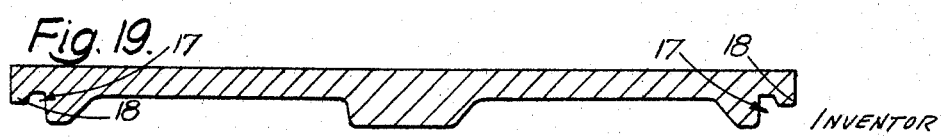

Specific constructions of gutter embodying the invention, for underlying the join between roofing tiles will now be described by way of example and with reference to the accompanying drawings in which:

FIGURE 1 is a sectional view on the line 1—1 of FIGURE 2, i.e. looking across the slope of a tiled roof, and showing tiles in full side view and sectional side view, FIGURE 2 is a view in the direction of the arrow A of FIGURE 1, FIGURE 3 shows a perspective view of a gutter, FIGURE 4 shows a cross-sectional view on the plane 4—4 of FIGURE 3, FIGURE 5 is a sectional view on the line 5—5 of FIGURE 6, i.e. looking across the slope of a tiled roof, and showing tiles in full side view and sectional side view, FIGURE 6 is a view in the direction of the arrow A of FIGURE 5, FIGURE 7 shows a perspective view of another form of gutter, FIGURE 8 shows a cross-sectional view on the plane 8—8 of FIGURE 7, FIGURE 9 shows a plan view of a single tile, FIGURE 10 is an underneath plan of the tile, FIGURES 11 and 12 are fragmentary sectional views on the lines D—D and E—E in FIGURE 10, FIGURE 13 is a fragmentary sectional view on the line F—F in FIGURE 9, FIGURE 14 is a fragmentary view in the direction of the arrow G in FIGURE 9, FIGURES 15 and 16 are respectively a side view and an end view in the direction of the arrows H and J in FIGURE 9, FIGURES 17 and 18 are sectional side views on the planes A—A and C—C respectively in FIGURE 10, FIGURE 19 is a sectional end view on the line B—B of FIGURE 10, FIGURE 20 is an end view in the direction of arrow K in FIGURE 10, and FIGURE 21 is a side elevation of another form of gutter.

Referring to FIGURES 1 to 4, the tiles 10 are identical castings made from concrete and are disposed in rows extending across the slope of the roof, the heads of the tiles in each row being overlapped by the tails of the tiles in the next higher row. The tiles in each row are respectively aligned along the slope of the roof with the tiles in the two next adjacent rows. Battens 11 are nailed to the rafters 12 of the roof at intervals in the usual manner, and each tile 10 has projecting from its undersurface two ribs 13 spaced apart transversely of the tile and these ribs rest against one of the battens 11 to locate the tile.

The upper face of each tile is smooth except for a pair of spaced parallel ridges 14, 15 which extend across the head of the tile, the ridge 15 nearer the head of the tile being slightly less tall than the other ridge 14.

On its undersurface each tile has a bottom flange 16 and a parallel spaced ridge 27 extending across the tail end of the tile, and two large recesses formed in the central part to reduce the weight of the tile. Flange 16 is reduced in height over a short length 16a at each end. Ridge 27 is less tall than bottom flange 16, and the latter rests on the head portion of the tile beneath to space ridge 27 from the tile beneath thus to form a barrier to upward capilliary flow of water under the tail of the tile. Along each of its side edges, each tile has a rebate 17 extending from the bottom flange 16 to the upper edge of the tile and, where each tile abuts a neighboring tile the two rebates 17 together form an inverted channel opening to the undersurface of the tiles. The channel extends from the head end of the tile and terminates a short distance from the tail end of the tile at the bottom flange 16. A small downwardly extending rib 18 is formed along each extreme lateral edge of each tile and projects a small distance into this channel.

A gutter 19 is disposed in the channel so formed by each laterally adjoining pair of tiles 10. The gutter is shown in more detail in FIGURES 3 and 4 and will be seen to comprise a channel section portion 20 having at its upper end a transversely extending wall 21 which projects upwards beyond the sides of the portion 20 and which rests against the head ends of the two tiles. The upper end portion of the gutter rests on the batten which supports the two tiles, and a locating flange 22 having a strengthening web 23 projects from the bottom surface of the channel section portion in a position such that the flange is disposed close to the lower side of the batten. Two spaced transversely extending ribs 24, 25 project from the bottom face of the channel-section portion near its lower end. The lower end portion of the gutter rests on the taller ridge 14 on the head of the tile in the row beneath. In consequence the bottom of the channel-section portion is spaced above the smaller ridge 15. The two ribs 24, 25 on the bottom surface of the portion 20 stop short of the upper face of the tile beneath. The bottom wall of the channel section portion 20 has a centrally formed upwardly curved part forming a low dividing wall 26 between the co-planar sides of the channel-section portion. The reduced height of the portions 16a of the bottom flanges 16 of the tiles are just opposite the lower end of the gutter so that water flowing down the gutter can escape under this flange.

Thus any water falling through the join between two tiles is collected by the gutter beneath the join and, at the bottom end of the gutter can flow under the flange 16 and down over the next lower row of tiles and/or into the aligned next lower gutter. The transverse wall 21 of the gutter forms a barrier to wind-blown rain, and the spaced ribs 24, 25 and ridges 14, 15 together form a local barrier to capillary flow under the tail of the tiles. The gutter is located lengthwise by the engagement of transverse wall 21 and flange 22 with the heads of the tiles and the batten respectively, and is located laterally by the side ribs 18 of the tiles as can be seen in FIGURE 2.

The gutter in this instance is an injection moulding made from polyvinyl chloride, but could be made from metal or, with suitable design modifications, from ceramics or concrete or fibre-reinforced (e.g. glass fibre reinforced) thermosetting resins.

The design of the tile allows a degree of tolerance in the relative positions of interengaging tiles both laterally and lengthwise. FIGURE 2 shows laterally neighboring tiles both abutting and with maximum clearance between them, the normal gap being approximately half of the maximum. The longitudinal overlap between the left-hand and middle tiles in FIGURE 1 is a minimum and that between the middle and right-hand tiles is a maximum.

FIGURES 5 to 20 show a slightly modified gutter 19 and give a fuller illustration of the tiles 10. Like components are provided with the same reference numerals as in the example shown in FIGURES 1 to 4. The modification is that the bottom wall of the channel section portion 20 of the gutter 19 is plane, the dividing wall 26 being omitted.

FIGURE 21 illustrates a further modification of the gutter 19 in which the strengthening web 23 extends along a greater length of the gutter.

The invention is not restricted to the details of the foregoing examples. For instance, the transverse wall 21 may be omitted if not required. The number of parallel ridges across the head and tail of the tile may be altered in some designs, i.e. there may be one or more such ribs.

I claim:
1. A tiled roof comprising tiles comprising identical castings made from concrete and disposed in rows extending across the slope of the roof, the heads of the tiles in each row being overlapped by the tails of the tiles in the next higher row, the tiles in each row being respectively aligned along the slope of the roof with the tiles in the two next adjacent rows, battens being nailed to rafters of the roof at intervals, each tile having projecting from its undersurface two nibs spaced apart transversely of the tile, the nibs resting against one of the battens to locate the tile, the upper face of each tile being smooth except for a pair of spaced parallel ridges which extend across the head of the tile, the ridge nearer the head of the tile being slightly less tall than the other ridge the undersurface of each tile having a bottom flange and a parallel spaced ridge extending across the tail end of the tile, two large recesses formed in the central part to reduce the weight of the tile, the bottom flange being reduced in height over a short length at each end, the parallel spaced ridge being less tall than the bottom flange which latter rests on the head portion of the tile beneath to space the said parallel spaced ridge from the tile beneath thereby to form a barrier to upward capillary flow of water under the tail of the tile, each of which tiles is provided along each of its side edges with a rebate extending from the bottom flange to the upper edge of the tile and, where each tile abuts a neighbouring tile the two rebates together forming an inverted channel opening to the undersurface of the tiles, the channel extending from the head end of the tile and terminating a short distance from the tail end of the tile at the bottom flange, a small downwardly extending rib being formed along each extreme lateral edge of each tile and projecting a small distance into the said channel, a gutter being disposed in the channel so formed by each laterally adjoining pair of tiles, the gutter comprising a channel section portion having at its upper end a transversely extending wall which projects upwards beyond the sides of the portion and which rests against the head ends of the two tiles, the upper end portion of the gutter resting on the batten which supports the two tiles, and a locating flange having a strengthening web projecting from the bottom surface of the channel section portion in a position such that the locating flange is disposed close to the lower side of the batten, two spaced transversely extending ribs projecting from the bottom face of the channel section portion near its lower end, the lower end portion of the gutter resting on the taller ridge on the head of the tile in the row beneath, whereby the bottom of the channel section portion is spaced above the smaller ridge, the two ribs on the bottom surface of the portion stopping short of the upper face of the tile beneath, the bottom wall of the channel section portion being substantially plane, the said reduced height of the portions of the bottom flanges of the tiles being just opposite the lower end of the gutter so that water flowing down the gutter can escape under this flange, whereby any water falling through the joint between two tiles is collected by the gutter beneath the join and, at the bottom end of the gutter, can flow under the said flange and down over the next lower row of tiles into the aligned next lower gutter, the said transversely extending wall of the gutter forming a barrier to wind-blown rain, and the said spaced ribs and said ridges together forming a local barrier to capillary flow under the tail of the tiles, the gutter being located lengthwise by the engagement of the said transversely extending wall and the said locating flange with the heads of the tiles and the batten respectively, and being located laterally by the side ribs of the tiles, the design of the tile being such as to allow a degree of tolerance in the relative positions of interengaging tiles both laterally and lengthwise, the normal gap being approximately half of the maximum.

2. A roof having a plurality of laterally extending rows of tiles, the tails of the tiles in each row overlapping the heads of the tiles in the next lower row, which heads are each provided on their upper surfaces with at least one transversely extending upstanding rib, each of said tiles abutting but not overlapping the adjacent tiles in the same row, gutters which underlie the joint between adjacent tiles in a row which gutters each comprises a channel section of substantially the same length as each tile having a substantially plane bottom wall and a portion of the channel section extending over the ribs of the tiles of the said next lower row and having at least one flange projecting from the underside of said bottom wall and extending at right angles to the lengthwise dimension of the gutter towards the tiles of the said next lower row.

3. A roof as claimed in claim 2 in which the upper face of each tile has at its head end at least two transverse upstanding ribs extending across the upper face of the tile, each gutter overlapping said ribs on the tile in the next lower row and the overlapping portion of the gutter having on its bottom surface at least one flange projecting towards but stopping short of the upper face of that title, said flange being staggered relative to the upstanding ribs.

4. A roof, as claimed in claim 3, in which the bottom surface of each gutter is spaced above at least one of said ribs.

5. A roof as claimed in claim 2, having a locating flange projecting downward beyond the bottom surface of the said bottom wall.

6. A roof as claimed in claim 2, in which each tile has extending along each of its side edges abutting the adjacent tiles a rebate such that two rebates in a pair of adjacent tiles together form a channel opening on the underside of the tiles which opening has a height and width sufficient to enable the channel wholly to accommodate at least the channel section portion of the gutter.

7. A roof as claimed in claim 6, in which the rebates and the gutter terminate short of the tail of the tile.

8. A roof as claimed in claim 7, in which the channel section of each gutter is closed at its upper end by a flange which projects above the channel section and abuts the head end of at least one of the two tiles which the gutter underlies.

References Cited

UNITED STATES PATENTS

| 37,211 | 12/1862 | Benedict | 52—553 |
|---|---|---|---|
| 633,984 | 10/1899 | Blocher | 52—533 |
| 670,723 | 12/1901 | Nebeling | 52—550 |
| 1,709,376 | 4/1929 | Shirley | 52—553 |
| 2,612,246 | 9/1952 | Whitehouse et al. | 52—478 |
| 2,663,918 | 12/1953 | Pollock | 52—533 |
| 3,307,302 | 3/1967 | Gutierrez | 52—14 |

FRANK L. ABBOTT, *Primary Examiner.*

JAMES L. RIDGILL, JR., *Assistant Examiner.*

U.S. Cl. X.R.

52—14, 95, 478, 533, 538, 542, 550, 551